United States Patent Office 2,944,293
Patented July 12, 1960

2,944,293

DENTURE MATERIAL COMPOSITION AND METHOD OF PRODUCING DENTURES

Philander B. Taylor, Larchmont, N.Y., assignor to Cosmos Dental Products, Inc., New York, N.Y., a corporation of New York No Drawing. Filed Nov. 16, 1953, Ser. No. 392,510

10 Claims. (Cl. 18—55.1)

This invention relates to a novel composition of matter and to a process for compounding the novel composition into an improved denture. More particularly, it relates to a novel composition of matter for producing artificial dentures of delicately blended coloration which simulate the natural coloration of the palate and gums.

Heretofore, the gum and palate portions of artificial dentures have been prepared from various denture base materials, such as polymerized methyl methacrylate, copolymers of softer acrylate and methyl methacrylate, copolymers of vinyl chloride and vinyl acetate, and polystyrene, by combining such base materials containing a pink pigment with a suitable polymerizable plasticizing agent such as the monomers of methyl methacrylate or styrene. The plasticizing agent and the base material were mixed and agitated to provide a viscous slurry, which upon standing set into a doughy mass of uniform texture and color. The doughy mass was packed into a suitable mold of which the male member was a replica of the patient's mouth and of which the female member was a replica of the desired final denture, containing the teeth. Curing the doughy mass in the mold by the application of heat resulted in the formation of the completed denture. The final denture approximated the color of the gums and palate but could readily be detected as artificial because of its uniform color. In contrast with the artificial denture, normal oral tissues contain varied hues which differ both in intensity and color due to the presence of veins and contraction of muscles, and the like. Hence, the inability to accurately produce a variegated colored denture caused patients considerable embarrassment.

It has now been found that by suitable modification of the formulae of the denture base materials and by suitable manipulation of the modified formulae, artificial dentures may readily be prepared which remarkably simulate the color variations present in oral tissues.

This improvement results from the mixing with or incorporation into a conventional pigmented denture base material, a quantity of highly pigmented particles of a polymeric material compatible with and readily plasticized by the polymerizable plasticizer for the denture base material. More specifically, by combining highly pigmented particles of the character set forth with denture base materials containing conventional pink pigment with suitable polymerizable plasticizers the pigmented denture base materials are affected in conventional manner while the highly pigmented particules are softened and caused to swell permitting each pigmented particle to deform and disperse its pigment effect to a somewhat larger localized volume. After the mixture has gelled, manipulation of the mass such as by kneading, rolling or the usual packing of the material into a dental mold and the flow of material incident to the mold closure will cause the softened highly pigmented particles to deform, disperse and streak in a highly desirable fashion.

The pigmented particles incorporated with the denture base material must be compatible with the polymerizable plasticizer and subject to marked softening thereby. The degree of softening and swelling of the highly pigmented particles in a given formation must be controlled so that only the desired dispersion and blending of the concentrated color is realized. Stratification of the mass is necessary in order to get the desired effect. The comparative resistance of the plasticized pigmented particles to the effects of the polymerizable plasticizer is critical since otherwise the pigment contained in these particles would be dispersed uniformly throughout the entire doughy mass and the color of the completed denture would be uniform as in the dentures heretofore known. Particularly suitable for this purpose are particles containing a polymeric material such as ethyl cellulose, methyl cellulose, "Vinylite" powders which are copolymers of vinyl acetate and vinyl chloride, polymerized slightly cross-linked methyl methacrylate, copolymers of ethyl methacrylate and methyl methacrylate and the like. The rate of softening of these pigmented materials can be altered by incorporation of suitable plasticizers such as dibutyl phthalate and like substances.

The intense coloration of the particles is obtained by the presence of suitable pigments in the mass. While many colors may be employed, the colors visible in normal oral tissues include various hues of pink, red, white, and blue. The variations in hue can of course be produced by differences in the relative amounts of pigment and it is preferable, therefore, to employ pigments of deep color, e.g., cadmium oxide for red, cobalt oxide for blue, and titanium oxide or zinc oxide for white. The pigments will of course be such as are non-toxic, whether normally so or whether so rendered by virtue of their being coated by inert material such as the denture base material.

The particles may vary considerably in size and shape and may readily be produced in the form of pellets or sections of a filament or small dimensioned rods, granules and the like. When working with materials such as ethyl cellulose, methyl cellulose, or the "Vinylite" powders, the material may be softened or melted along with a plasticizer and the pigment dispersed therein. The solution may then be extruded into sheets, filaments or rods and cut into particles of desired size. Alternatively, the molten plasticized pigmented material may be poured on a flat polished surface to form a sheet from which the particles may be stamped out or cut. In place of a flat polished surface two steel plates preheated to 120° C. may be utilized to melt the material and form a sheet. Another way in which the particles can be prepared is by compressing plasticized and pigmented material into cartridges under pressure at 100° C. to 200° C., then pressing the cartridges into sheets from which the particles may be punched out or cut as heretofore described. The residue from the sheets after the punching operation can be reused.

Where the pigmented particles consist of slightly cross-linked polymerized methyl methacrylate and pigment, monomeric methylmethacrylate together with a cross-linking agent in the presence of the pigment are polymerized to form a spongy mass which is then broken up and screened on a 20 mesh sieve. The screenings are then screened on a 40–50 mesh sieve and the particles passing through the sieve are discarded and the particles remaining on the sieve are used as the pigmenting particles. In producing the pigmented particles from methyl methacrylate and ethyl methacrylate, the monomeric compounds in the presence of pigment are polymerized and screened in substantially the same manner as is forming the partially cross-linked methyl methacrylate pigmented particles.

The size of the individual highly pigmented particles may be varied considerably and are dependent upon the material from which they are made from the standpoint of rate of plasticization or attack by the monomer but said particles should preferably be considerably larger than the particles of powdered polymerized methyl methacrylate, where said compound constitutes the denture base material. Very fine highly pigmented particles will be attacked too quickly whereupon their color will be distributed uniformly throughout the doughy mass. Highly pigmented particles which are too large will be attacked too slowly in the time desired for initial setting of such particles, hence, such particles will be predominantly intact and the intense coloration produced thereby will be unduly localized.

For the initial setting, a period of about eight minutes has generally been found desirable and normal room temperatures and atmospheric pressures are preferred. For these preferred conditions the highly pigmented particles should be about .125 inch long and about .016 inch in diameter, i.e., about $2 \times 10^{-5}$ cubic inches in volume. Preferably, the particle size is such that 100 particles weigh approximately 50 milligrams.

The following examples are illustrative of the preparation of the highly pigmented particles:

*Example I*

In a ball mill 100 grams of ethyl cellulose are mixed with 1 to 5 grams of pigment; for the white 5 grams of titanium oxide; for dark red 2½ grams of cadmium red; for light red 1¼ grams of cadmium red; for blue 2½ grams of ultra marine blue, altered with traces of cadmium yellow or orange. The mass is transferred to a hand mixer and mixed with 35 grams of dibutyl phthalate at room conditions until well mixed and wetted. The wetted mass is heated to about 120° C. (118° C. to 132° C. preferred range) and rolled to form a sheet about .02 inch thick or extruded to form filaments or rods of desired diameter. From the sheet the particles are obtained by punching out, while from the filaments or rods they may be cut to desired length. Increasing the quantity of plasticizer up to about 50 grams will produce particles which are more readily softened by monomeric methyl methacrylate used in preparation of the denture mass, thereby decreasing the permissible setting or gelling time. A gelling time of about 15 minutes can be obtained by reducing the plasticizer content to 25 grams in the above formulation. It will, of course, be understood that the gelling time of the pigmented particles should preferably be somewhat greater than the gelling time for the base material so that, upon spatulation or kneading of the doughy mass, the pigmented particles will disperse and streak their colors through the base material.

*Example II*

In making pigmented particles of methyl cellulose substantially the same procedure is followed with ethyl cellulose.

*Example III*

In making pigmented particles of "Vinylite"; 10 grams of "Vinylite" VYNS (88.5%–90.5% vinyl chloride having a molecular weight of approximately 16000) and 5 grams of "Vinylite" VYHH (85%–88% vinyl chloride having a molecular weight of approximately 10,000) and 9 cc. of dibutylphthalate as a plasticizer and from 0.066 to 0.33 gram of pigment are mixed in a ball mill, then melted and pelletized according to the procedure outlined in Example I.

*Example IV*

The same procedure set forth in Example III was followed using 15 grams of "Vinylite" VYHH and 9 cc., 6 cc. and 3.75 cc., respectively, of dibutylphthalate with satisfactory results.

*Example V*

The same procedure set forth in Example III was followed using 15 grams "Vinylite" VYNS and 12 cc. and 6 cc., respectively, of dibutylphthalate, with satisfactory results.

*Example VI*

In making pigmented particles from polymerized cross-linked methyl methacrylate; .600 cc. of monomeric methyl methacrylate to which has been added 1.5 cc. or less of a cross-linking agent such as vinyl methacrylate, divinyl ether or divinyl benzene depending upon the degree of cross-linking desired, and from 6 to 30 grams of pigment are polymerized. The resulting spongy mass is broken up and screened as hereinbefore set forth.

*Example VII*

In making pigmented particles from copolymers of ethyl methacrylate and methyl methacrylate; equal amounts of the monomers to which mixture from .5 to 2.5% of pigment has been added, are polymerized to a spongy mass and broken down and screened as in the case of the polymerized cross-linked methyl methacrylate pigmented particles. The polymerized ethyl methacrylate being more readily attacked by methyl methacrylate monomer, the amount of ethyl methacrylate which is used in producing the polymerized copolymer controls or determines the rate of attack or swelling of the pigmented particles. Because the pigmented particles are larger than the powdered particles of polymerized methyl methacrylate of the denture base material, they are attacked slower than such powdered base material, the monomer entering the surface and causing surface softening which gives a gradation of color dispersion. Within the gellation time of the base material, the larger pigmented particles are penetrated to the same extent as the base material. Accordingly, the ethyl methacrylate in the pigmented particles serves the function of a plasticizer.

The denture composition is prepared by mixing the intensely colored particles with the denture base material prior to manipulation into a doughy mass and packing in a mold. Where powdered polymerized methyl methacrylate is the denture base material, the procedure is as follows:

For a full denture made from 35 cc. (28 grams) of powdered polymerized methyl methacrylate about 350 to 1000 individual particles (0.175 gram to 0.5 gram) are adequate for producing the desired color gradations. For small dentures as few as 100 intensely colored particles are sufficient. Preferably the added material for producing the various color hues includes discrete particles of several different colors, viz., red, white, and blue. While the amounts and proportions are subject to considerable variation, in practice it has been found desirable to employ a major amount of red particles, up to 66%, the remainder of the particles being about equally divided between white and blue.

If it is desired that the denture base material shall be supplied as a prepared gel, the procedure could be as follows:

A gel is prepared by mixing a suitable mixture of polymers, or polymer such as polymerized methyl methacrylate powder with a suitable polymerizable plasticizer such as monomeric methyl methacrylate in approximately equal amounts. The liquid is first poured into a mixing jar and the powder is slowly added thereto under constant stirring until a viscous solution is formed. The viscous solution is allowed to stand until the mass becomes quite thick but still capable of being spatulated. The pigmented particles are then blended into the mixture and the mass stored in suitable covered containers until the gel reaches the usual packing consistency. In this form it constitutes the gel and can be kept in this condition for several weeks under refrigeration. When ready for use, the gel is manipulated by hand or rollers to get the desired color dispersion, after which it is packed in a mold and cured in the usual manner.

Examples of formulations of the powdered denture base compositions suitable for the practice of the invention are as follows:

Example VIII

| | |
|---|---|
| Pigmented powdered polymerized methyl methacrylate dental resin formulated and screened for approximately an 8–10 minute gelation to packing consistency | 35 cc. (28 grams). |
| Highly pigmented particles: | |
| Red, 225 mg | 450 particles. |
| White, 100 mg | 200 particles. |
| Blue, 75 mg | 150 particles. |

Preferably, the red particles are used in the ratio of 3 dark red particles to 1 light red particle.

Example IX

| | |
|---|---|
| Pigmented powdered polymerized methyl methacrylate dental resin formulated and screened for approximately an 8–10 minute gelation to packing consistency | 35 cc. (28 grams). |
| Highly pigmented particles: | |
| Red, 150 mg | 300 particles. |
| White, 25 mg | 50 particles. |
| Blue, 25 mg | 50 particles. |

In preparing a denture, to about 35 cc. of powdered polymerized methyl methacrylate containing about 850 (425 mg.) of highly pigmented particles in random distribution, contained in a jar, there is added about 12.5 cc. of monomeric methyl methacrylate and the mass is stirred gently for about fifteen seconds in order to obtain a slurry wherein all of the solid is wet by the liquid. The jar is closed and the mass is then allowed to stand for about eight minutes during which time it partially sets into a doughy mass. Simultaneously therewith the colored particles are attacked to varying degrees resulting in enlargement of the effective highly pigmented areas to a size of from about two to about ten times that of the original particles. After standing the requisite time the mass is spatulated gently with a broad blade spatula with four or five strokes pressing the material from the center of the jar toward its sides, whereupon some of the colored nuclei are transformed to blotches and veins or threads of color. The entire mass is then transferred to a clean non-adhering surface such as moistened cellophane. Another sheet of moistened cellophane is placed thereover and the mass is pressed into a patty about 0.15 inch thick by application of substantially uniform pressure, such as by a glass or metal plate. This patty may be manipulated slightly to effect further color dispersion but such manipulation should be effected with caution since excessive dispersion may result in loss of desired color characterizations in the product. The material is then packed in conventional manner in the female mold, the male mold member is applied and the mold placed in a spring compress and tightened. The mold is immersed in water which is brought up to about 70° C. and held there for about two hours. Thereafter the water is boiled for about thirty minutes and allowed to bench cool.

Example X

In the formulation of the invention with the prepared gel containing the pigmented particles, the number of colored particles used are in substantially the same proportion to the total quantity of base material or gel as in the case of the powdered denture base material. The procedure followed in preparing a denture is to manipulate the prepared gel by hand or rollers until the mass attains the desired color dispersion after which the same procedure is followed as with the powdered base material described in Example IX.

The packing and molding techniques described are those conventionally employed. With the new compositions certain modifications in such techniques may be made which permit a more perfect simulation of a normal gum or palate. For example, just prior to packing of the mold the patty may be examined to assure that there are no insufficiently dispersed color particles. Such particles, if present, may be cut out with a spatula or by the application of local pressure with a finger, spatula, or like instrument, further dispersion of such particles may be effected. Furthermore, select areas of the patty having certain desirable color characteristics may be cut out and placed into the mold at predetermined areas where the particular color characteristic is desirable and then the packing may be completed with the remainder of the patty as heretofore described.

This type of selected packing is particularly desirable and effective in producing dentures having the appearance of natural oral tissues. For example, in raising the lip to expose a normal gum to view certain muscles are tensed and appear lighter in color than the surrounding areas. Hence, by cutting out of the patty a portion of lighter hue and positioning it properly within the mold the appearance of this muscle can be simulated. In an analogous manner the blue of veins and deeper red areas can be simulated. The final result is a restoration which defies detection.

Various changes and modifications may be made without departing from the spirit and scope of this invention as hereinafter claimed.

What I claim is:

1. A composition of matter adapted for use in making oral restorations, comprising a mixture of a major amount of polymerized denture base material, pink in color, and a minor amount of particles of a polymeric plastic material which are discretely pigmented with colors normally found in oral tissue, said pigmented particles, each being of a size to be seen at a glance in the mixture by the unaided eye and being plasticizable to a greater degree than the denture base material by a common compatible polymerizable plasticizer, and said pigmented particles when so plasticized in the mixture being adapted to remain at least as plastic as said denture base material during the gelling stage of the mixture.

2. A composition according to claim 1, wherein the denture base material is in fine granular or powdered form, the pigmented particles are of much larger size than the powdered granules of the base material and are plasticizable more readily than the denture base material.

3. A composition according to claim 1, wherein the denture base material is a gel consisting of about equal parts of polymerized methyl methacrylate and monomeric methyl methacrylate and the pigmented particles contain an inert pigment.

4. A composition according to claim 1, wherein the mixture comprises about 280 parts by weight of the denture base material and about 2 to 5 parts by weight of the colored particles, each colored particle consisting of a major amount of the polymeric plastic material and a minor amount of inert pigment, wherein the particles are approximately the same size and discretely colored red, white and blue, and the number of red pigmented particles is at least as great as the sum of the white and the blue pigmented particles.

5. A composition according to claim 4, wherein the denture base material is polymerized methyl methacrylate and the pigmented particles each consists of ethyl cellulose including from about 0.3 to 0.5 part by weight of plasticizer for each part by weight of ethyl cellulose and from about .01 to about .05 part by weight of inert pigment for each part by weight of ethyl cellulose.

6. A composition of matter according to claim 4, wherein the denture base material is polymerized methyl methacrylate and the pigmented particles each consists of methyl cellulose, including from about 0.3 to about 0.5 part by weight of dibutyl phthalate and from about 0.1 to about 0.5 part by weight of inert pigment for each part by weight of methyl cellulose.

7. A composition according to claim 4, wherein the denture base material is powdered polymerized methyl methacrylate and the pigmented particles each consists of plasticized vinyl chloride-vinyl acetate copolymer, each of said particles including for each 15 parts by weight of vinyl chloride-vinyl acetate copolymer, from about 3.75 to about 9.0 parts by weight of dibutyl phthalate, and from about .066 to about 0.33 part by weight of inert pigment.

8. A composition according to claim 4, wherein the denture base material is powdered polymerized methyl methacrylate and the pigmented particles are slightly cross-linked polymerized methyl methacrylate, each of said particles including from about 1.0 to 3.0% of inert pigment by weight.

9. A composition according to claim 4, wherein the denture base material is powdered polymerized methyl methacrylate and the pigmented particles each consists of copolymerized ethyl methacrylate and methyl methacrylate, each of said particles including from about 1.0 to about 3.0% of inert pigment by weight.

10. A process for the preparation of a denture of heterogeneous color distribution, comprising mixing a major amount of pink colored denture base material with a relatively small amount of particles of polymeric plastic material which are discretely intensely pigmented with colors present in normal oral tissue, said particles being at least as readily plasticizable as the denture base material by a common compatible polymerizable plasticizer, and said particles, when so plasticized in the mixture, being softened and remaining more plastic than said denture base material during the gelling stage of the mixture, adding a sufficient amount of polymerizable plasticizer to the mixture to form a slurry, allowing said slurry to stand for several minutes to form a gelled doughy mass and applying localized pressure by gentle kneading or spatulation to deform the doughy mass and thereby disperse and streak the more plastic colored particles through the dough mass to an effective volume many times the original volume of the colored particles.

References Cited in the file of this patent

UNITED STATES PATENTS

| | | |
|---|---|---|
| 2,234,993 | Vernon et al. | Mar. 18, 1941 |
| 2,326,531 | Gates | Aug. 10, 1943 |